United States Patent
Trimberger (10) Patent No.: US 10,657,292 B2
(45) Date of Patent: May 19, 2020

(54) SECURITY FOR PROGRAMMABLE DEVICES IN A DATA CENTER

(71) Applicant: Xilinx, Inc., San Jose, CA (US)

(72) Inventor: Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 292 days.

(21) Appl. No.: 15/845,958

(22) Filed: Dec. 18, 2017

(65) Prior Publication Data

US 2019/0188419 A1 Jun. 20, 2019

(51) Int. Cl.
*G06F 17/50* (2006.01)
*G06F 21/76* (2013.01)
*G06F 15/78* (2006.01)

(52) U.S. Cl.
CPC .......... *G06F 21/76* (2013.01); *G06F 15/7867* (2013.01); *G06F 17/5054* (2013.01)

(58) Field of Classification Search
CPC ....................................................... G06F 21/76
USPC ............................................................. 716/52
See application file for complete search history.

(56) References Cited

U.S. PATENT DOCUMENTS

| | | | |
|---|---|---|---|
| 5,349,249 A | 9/1994 | Chiang et al. | |
| 6,020,633 A | 2/2000 | Erickson | |
| 6,118,869 A | 9/2000 | Kelem et al. | |
| 6,499,124 B1 | 12/2002 | Jacobson | |
| 6,748,368 B1 | 6/2004 | Trimberger et al. | |
| 6,864,142 B1 | 3/2005 | Conn | |
| 6,873,177 B1 | 3/2005 | Wennekamp et al. | |
| 6,894,527 B1 | 5/2005 | Donlin et al. | |
| 7,180,776 B1 | 2/2007 | Wennekamp et al. | |
| 7,243,227 B1 | 7/2007 | Knapp | |
| 7,343,578 B1 * | 3/2008 | Patterson ............ | G06F 17/5045 716/117 |
| 7,345,502 B1 | 3/2008 | Lakkapragada et al. | |
| 7,353,487 B1 | 4/2008 | Bergendahl et al. | |
| 7,536,559 B1 | 6/2009 | Jenkins, IV et al. | |

(Continued)

FOREIGN PATENT DOCUMENTS

WO  2016118224  7/2016

OTHER PUBLICATIONS

Corbett, John D., "The Xilinx Isolation Design Flow for Fault-Tolerant Systems," WP412 (v1.1), Oct. 16, 2013, pp. 1-8, Xilinx, Inc., San Jose, California, USA.

(Continued)

*Primary Examiner* — Suresh Memula
(74) *Attorney, Agent, or Firm* — Patterson + Sheridan, LLP (57) ABSTRACT

An example method of configuring a programmable integrated circuit (IC) in a computer system includes: selecting a first region of a programmable fabric of the programmable IC for implementation of a shell circuit, the shell circuit configured to interface with a bus of the computer system; selecting a second region of the programmable fabric for implementation of an application circuit, the application circuit configured to interface with the shell circuit; providing a fence region disposed between the first region and the second region, the fence region including a set of unconfigured tiles of the programmable fabric; generating configuration data for a circuit design having the first region, the second region, and the fence region; and loading the configuration data to the programmable IC.

20 Claims, 8 Drawing Sheets

(56) References Cited

U.S. PATENT DOCUMENTS

| | | | |
|---|---|---|---|
| 7,757,294 B1 | 7/2010 | Simkins | |
| 7,797,651 B1 * | 9/2010 | Jacobson | G06F 17/5081 326/37 |
| 7,890,916 B1 * | 2/2011 | Donlin | G01R 31/31727 716/106 |
| 7,930,661 B1 * | 4/2011 | Trimberger | G06F 17/5054 716/100 |
| 7,958,414 B1 | 6/2011 | Peterson et al. | |
| 8,074,077 B1 | 12/2011 | Neema et al. | |
| 8,355,502 B1 | 1/2013 | Donlin et al. | |
| 8,539,254 B1 | 9/2013 | Bridgford et al. | |
| 8,621,597 B1 | 12/2013 | Jenkins, IV | |
| 8,713,327 B1 | 4/2014 | Peterson et al. | |
| 8,981,810 B1 | 3/2015 | Trimberger et al. | |
| 9,047,474 B1 | 6/2015 | Ahmad et al. | |
| 10,339,243 B2 * | 7/2019 | Brissenden | G06F 17/5054 |

OTHER PUBLICATIONS

Fitzpatrick, Joe et al., "Stupid PCIe Tricks Featuring NSA Playset: PCIe," DEF CON 22 Hacking Conference, Aug. 7, 2014, pp. 1-92, https://www.defcon.org/html/defcon-22/dc-22-index.html.

Putnam, Andrew et al., "A Reconfigurable Fabric for Accelerating Large-Scale Datacenter Services," ACM SIGARCH Computer Architecture News, Jun. 1, 2014, pp. 13-24, vol. 42, Issue 3, ACM. New York, New York, USA.

Trimberger, Steve, "Security of FPGAs in Data Centers," 2017 IEEE 2nd International Verification and Security Workshop, Jul. 3, 2017, pp. 1-6, IEEE, Piscataway, New Jersey, USA.

Huffmire, Ted et al., "Security Primitives for Reconfigurable Hardware-Based Systems," ACM Transactions on Reconfigurable Technology and Systems, May 2010, pp. 10:1 to 10:35, vol. 3. No. 2, Article 10, ACM, New York, New York, USA.

McLean, Mark et al., "FPGA-Based Single Chip Cryptographic Solution (U)," Military Embedded Systems, Mar. 2007, pp. 1-4, vol. 3, No. 2, OpenSystems Media, Scottsdale, Arizona, USA.

Hallett, Ed, "Isolation Design Flow for Xllinx 7 Series FPGAs or Zynq-7000 AP SoCs (ISE Tools)", Feb. 5, 2015, (http://www.xilinx.com/support/documentation/application_notes/xapp1086-secure-single-fpga-using-7s-idf.pdf).

McNeil, Steve, "Developing secure designed with the Spartan-6 family using the isolation design flow", Sep. 8, 2015, XP055645361, (https://www.xilinx.com/support/documentation.appiication_notes/xapp1145_S6Secure_Designs.pdf).

Fitzgerald, Andrew, "Design and analysis of an FPGA-based, multi-processor HW-SW system for SCC applications", Nov. 1, 2010, XP055645409, (https://pdfs.semanticscholar.org/0887/599d26c121888887e5d2880b9787676cd16a.pdf).

* cited by examiner

SECURITY FOR PROGRAMMABLE DEVICES IN A DATA CENTER

TECHNICAL FIELD

Examples of the present disclosure generally relate to electronic circuits and, in particular, to security for programmable devices in a data center.

BACKGROUND

Recent deployments of programmable devices, such as field programmable gate arrays (FPGAs), as compute resources in data centers have raised security concerns. In typical usage, an application in a data center runs on top of a stack of hardware and software processes. The hardware can include a programmable device used for purposes of hardware acceleration, for example. A concern arises if a function in the programmable device can access other hardware directly, bypassing the software (e.g., an operating system, hypervisor, or the like). If the programmable device can intercept sensitive data and control physical memory locations, the programmable device can be used to compromise servers and potentially hijack the entire data center. Furthermore, if there is a requirement for the programmable device to pass data through the operating system/hypervisor (e.g., requiring the processor to manage all address translation), the performance and power advantages of the programmable device computation are drastically reduced.

SUMMARY

Techniques for security for programmable devices in a data center are described. In an example, a method of configuring a programmable integrated circuit (IC) in a computer system includes: selecting a first region of a programmable fabric of the programmable IC for implementation of a shell circuit, the shell circuit configured to interface with a bus of the computer system; selecting a second region of the programmable fabric for implementation of an application circuit, the application circuit configured to interface with the shell circuit; providing a fence region disposed between the first region and the second region, the fence region including a set of un-configured tiles of the programmable fabric; generating configuration data for a circuit design having the first region, the second region, and the fence region; and loading the configuration data to the programmable IC.

A non-transitory computer readable medium having stored thereon instructions that when executed by a processor cause the processor to perform a method of configuring a programmable integrated circuit (IC) in a computer system including: selecting a first region of a programmable fabric of the programmable IC for implementation of a shell circuit, the shell circuit configured to interface with a bus of the computer system; selecting a second region of the programmable fabric for implementation of an application circuit, the application circuit configured to interface with the shell circuit; providing a fence region disposed between the first region and the second region, the fence region including a set of un-configured tiles of the programmable fabric; generating configuration data for a circuit design having the first region, the second region, and the fence region; and loading the configuration data to the programmable IC.

A computing system includes: a processing system; a hardware accelerator coupled to the processing system, the hardware accelerator including: a programmable integrated circuit (IC) configured with an acceleration circuit having a first region of a programmable fabric for implementation of a shell circuit, the shell circuit configured to interface with a bus of the processing system, a second region for implementation of an application circuit, the application circuit configured to interface with the shell circuit, and a fence region disposed between the first region and the second region, the fence region including a set of un-configured tiles of the programmable fabric; a software platform executing on the processing system, the software platform including program code executable by the processing system to interface with the hardware accelerator.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for providing security for programmable devices in a data center are described. A programmable device, such as a field programmable gate array (FPGA), can be insecure when used as hardware in a data center. For example, FPGAs used as hardware accelerators or the like handle physical addresses. If user-defined logic in the FPGA can access these addresses, then that logic can manipulate privileged state. This undermines the security of the software platform in the data center. In addition, Peripheral Component Interconnect (PCI) express (PCIe) bus slaves can become masters and access any data on the bus. If user-defined logic in the FPGA connects to a PCIe bus, which is natural for passing data to the FPGA and retrieving results, then that logic can manipulate privileged state, potentially compromising other devices on the PCIe bus, including the processor. This further undermines the security of the software system. In another example, an unscrupulous or incompetent application developer can build an application with a current spike that violates maximum limits or overheats the FPGA, degrading performance, disabling the FPGA, or causing faults in the FPGA or other hardware.

The first two concerns above are manifestations of a single concern over separation of privileged access from user access. The solution described in examples herein involves the enforcement of a technique for separating these different levels of privilege. The third concern above involves physical manipulation of the hardware, which can also be addressed as described below.

Figure 1:
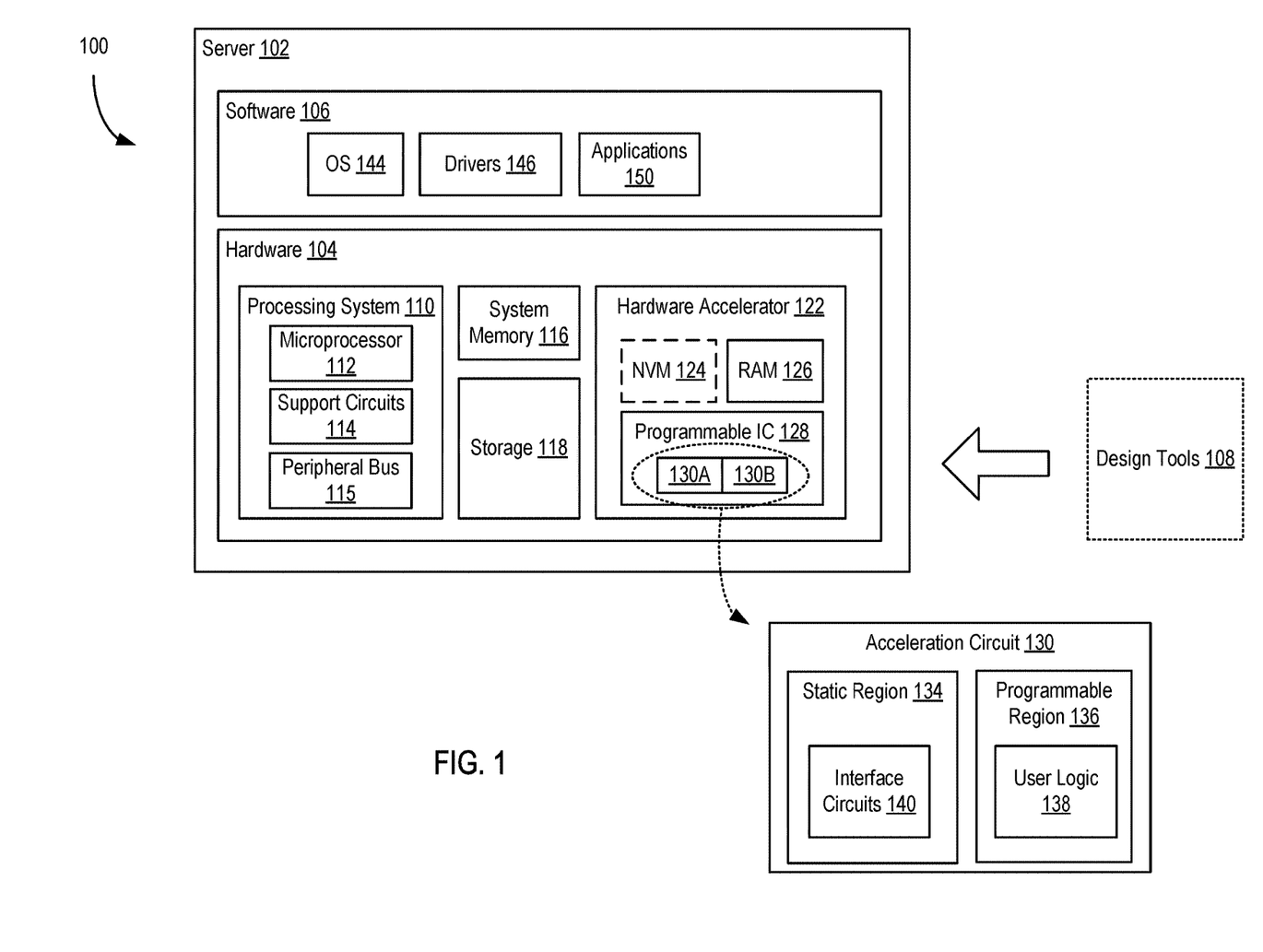
FIG. 1 is a block diagram depicting a computing system according to an example.

FIG. 1 is a block diagram depicting a computing system 100 according to an example. The computing system 100 can be located in a data center or the like. A data center can include a plurality of computing systems configured similarly to the computing system 100. The computing system 100 includes a server computer (server 102). The server 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, driver software (drivers 146), and applications 150.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a BIOS), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 110 is shown separate from the hardware accelerator 122. In other examples discussed further below, the processing system 110 and the hardware accelerator 122 can be implemented on the same integrated circuit (IC).

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

The hardware accelerator 122 includes a programmable IC 128, an optional non-volatile memory 124, and RAM 126. The programmable IC 128 can be a field programmable gate array (FPGA) or the like or an SoC having an FPGA or the like. The NVM 124 can include any type of non-volatile memory, such as flash memory or the like. The RAM 126 can include DDR DRAM or the like. The programmable IC 128 is coupled to the NVM 124 and the RAM 126. The programmable IC 128 is also coupled to the peripheral bus 115 of the processing system 110.

The OS 144 can be any commodity operating system known in the art, such as such as Linux®, Microsoft Windows®, Mac OS®, or the like. The drivers 146 provide application programming interfaces (APIs) to the hardware accelerator 122 for command and control thereof. The applications 150 include software executing on the microprocessor 112 that invokes the hardware accelerator 122 through the drivers 146 to perform some work. The applications 150 can include neural network, video processing, network processing, or the like type applications that offload some functions to the hardware accelerator 122.

In operation, the programmable IC 128 is configured with an acceleration circuit 130. The acceleration circuit 130 generally includes a shell circuit 130A and an application circuit 130B. For example, the acceleration circuit 130 can be implemented using a static region 134 and a programmable region 136. The static region 134 includes interface circuits 140. The programmable region 136 can include user logic 138. The shell circuit 130A is implemented using the static region 134, and the application circuit 130B is implemented using the programmable region 136. In another example, the shell circuit 130A can also be implemented using a portion of the programmable region 136. Thus, in some examples, the programmable region 136 also includes some interface circuits. In some examples, the acceleration circuit 130 can include more than one programmable region 136, each of which can be individually configured with user logic 138. Configuration data for the programmable IC 128 can be stored in the NVM 124 if present. If the NVM 124 is omitted, configuration data can be stored external to the hardware accelerator 122, such as in the storage 118. The configuration data for the programmable IC 128 can be generated by design tools 108, which can be executed on a computer system external to the server 102. The design tools 108 are used to compile a circuit design into the configuration data, which is then transmitted to and stored in the server 102 for configuring the programmable IC 128.

The static region 134 is "static" in that the circuitry thereof remains constant across reconfigurations of the programmable region 136. In an example, the interface circuits 140 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like.

Software systems enforce the separation of privileged from user code at the process level. Some processes run in privileged mode, and transition to privileged mode is enforced by a supervisor call to the OS. Privileged processes have access to resources not available to user processes. For example, user processes have access to only virtual addresses and not physical memory addresses. This separation is enforced by the hypervisor and OS.

FPGA-based computation can be thought of as spatial processing: computation is implemented by physical units, in contrast to traditional ("temporal") computation, which is implemented by a temporal sequence of operations at a single location in space. Analogously, in the FPGA temporal solution, there is a privileged space on the FPGA device and a user space. In the example of FIG. 1, the shell circuit 130A comprises the privileged space and the application circuit 130B comprises the user space. As long as the user space has access to only the non-privileged data, the system cannot be compromised.

In an example, the shell circuit 130A controls the signals accessible to the application circuit 130B. The application circuit 130B is the only part of the acceleration circuit 130 that users may define. The shell circuit 130A is defined by administrators or by designers at the behest of administrators. Data and addresses from the processing system 110 arrive on the PCIe bus. However, the application circuit 130B does not have access to the PCIe signals. Instead, the data and addresses are intercepted by the shell circuit 130A, which can prevent the application from unauthorized access to the PCIe bus. Similarly, the application circuit 130B may access the RAM 126 local to the hardware accelerator 122, but not the system memory 116 in the server 102.

The shell circuit 130A also abstracts the communication links, separating them from the application circuit 130B. The shell circuit 130A separates "privileged" mode operations from "unprivileged operations" in the application circuit 130B. This separation is analogous to separation of processes in a computer. The privileged shell circuit 130A protects the PCIe connection, manages clocking for the application circuit 130B, and monitors the activity of the programmable IC 128.

Figure 2:
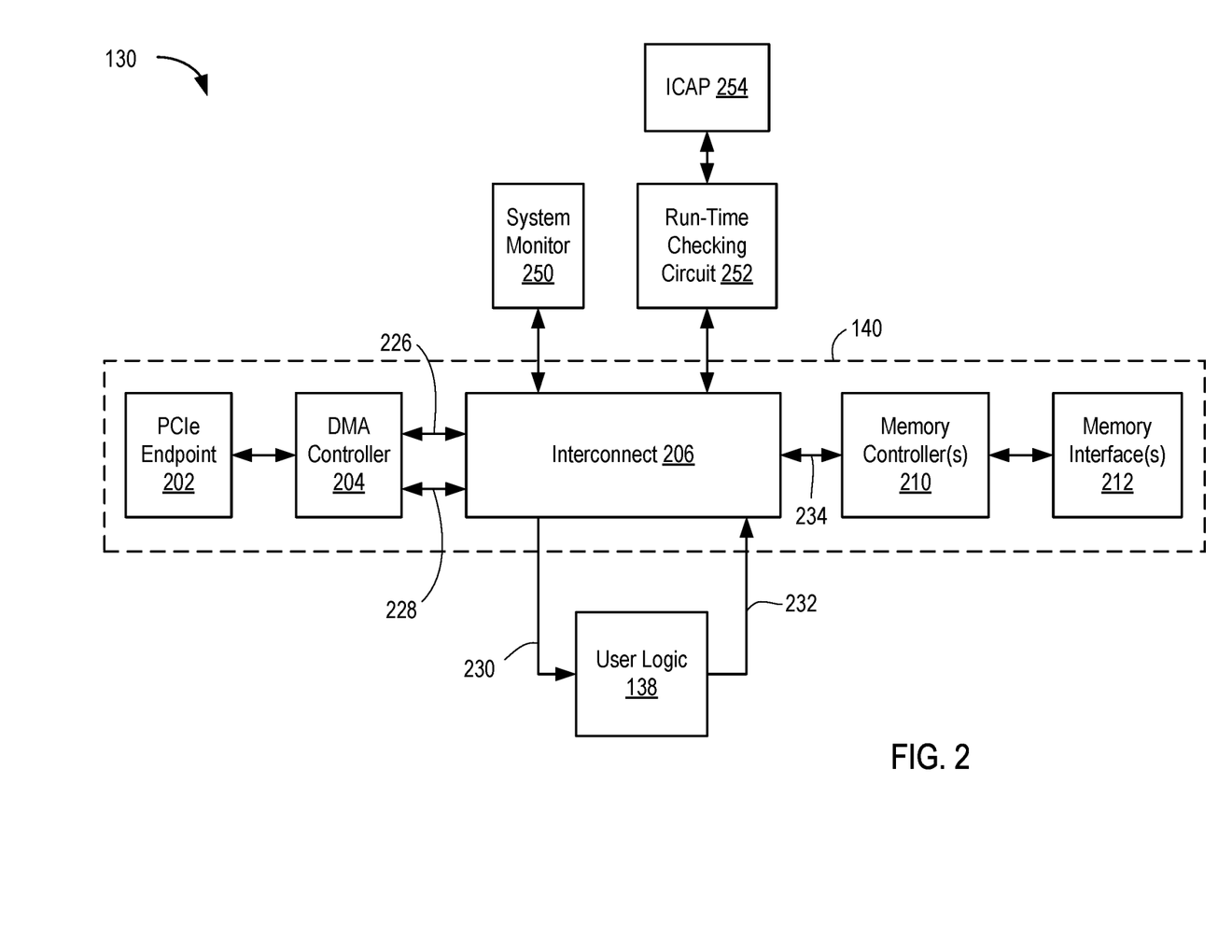
FIG. 2 is a block diagram depicting an acceleration circuit according to an example.

FIG. 2 is a block diagram depicting an acceleration circuit 130 according to an example. The acceleration circuit 130 includes the interface circuits 140 and the user logic 138. In the example, the interface circuits 140 include a PCIe endpoint circuit ("PCIe endpoint 202"), a DMA controller 204, interconnect circuits ("interconnect 206"), a memory controller 210, and a memory interface 212. The interface circuits 140 can include other support circuits, which are omitted for clarity (e.g., decoupler circuits, debug circuits, etc.). The PCIe endpoint 202 provides a physical interface to the peripheral bus 115. The DMA controller 204 facilitates DMA operations to the RAM 126, the memory 142, and the kernel(s) 138. The interconnect 206 couples the DMA controller 204 to the memory 142 and to an input interface of the kernel(s) 138. The interconnect 206 is coupled to an output interface of the user logic 238 and the memory controller 210. The memory controller 210 is coupled to the memory interface 212. The memory interface 212 is coupled to the RAM 126 (shown in FIG. 1).

In operation, the drivers 146 can access the user logic 138 directly through the DMA controller 204. The user logic 138 can access the RAM 126 through the memory controller 210. Data can be exchanged between the software 106 and the user logic 138 using DMA operations between the system memory 116 and the RAM 126.

Referring to FIGS. 1 and 2, a circuit designer uses design tools 108 to generate configuration data for the acceleration circuit 130. To ensure user logic does not have access to privileged data, the user logic is separated from the privileged shell logic at design time. In an example, users only define logic that is part of the application circuit 130B. The application circuit 130B has access to only a limited set of signals in the programmable IC 128. In an example, the shell circuit 130A and the application circuit 130B are compiled and physically placed into separate regions using a partial reconfiguration (PR) design flow. This separation limits the communication between regions to only those signals that the user has access to in the design file.

Using this logical isolation, the shell logic interfaces to sensitive system data, for example, the PCIe bus, raw packet information, and/or physical memory addresses. The shell exports interfaces for the user logic, for example data packets intended for the application and virtual addresses. The shell provides a restricted set of permitted PCIe access operations and a restricted set of memory addresses. This separation is enforced by restricting the user logic to only the restricted signals during design at the design tools 108. Logical isolation can be accomplished using design restrictions. To keep the user region from connecting the sensitive data, the design tools 108 do not provide that data to the user region during compilation.

The configuration data for the programmable IC 128 can be protected with cryptographic methods like any other data. The compilation process performed by the design tools 108 computes an authentication code for the compiled bitstream. In an example, a public-key scheme permits the programmable IC 128 to hold the public part of a key pair in observable memory. Logical isolation is provided by controlling the compilation process in the design tools 108. The next step is to ensure only properly compiled designs are loaded into the programmable IC 128. In an example, this is achieved using bitstream security features. The user logic and the shell logic are merged in a controlled execution of the design tools 108, which authenticates the design. The programmable IC 128 checks the authenticity of the design using the public key to ensure the design has not been tampered.

Using the above-described security flow requires that the programmable IC 128 be programmed with the decryption and authentication keys. This can be done in a data center environment. In one use model, when the data center is constructed, every programmable IC 128 is given the appropriate key(s) (e.g., programmed using eFuses or the like). Configuration bitstreams are delivered to the NVM 124 and loaded into the programmable IC 128 by triggering the configuration process.

In another use model, the shell circuit 130A is responsible for checking and loading the user application region using a partial reconfiguration mechanism. In this model, every system is initially configured with a design containing only the shell circuit 130A. The shell circuit 130A receives the user region partial reconfiguration bitstream and loads it through an internal configuration access port. The internal configuration access port can use the existing security features or the shell circuit 130A can authenticate the incoming user logic before loading the partial bitstream. One advantage of this model is that the shell circuit 130A can operate multiple independent user applications inside the programmable region 136 (e.g., there can be multiple instances of the user logic 138).

Figure 3:
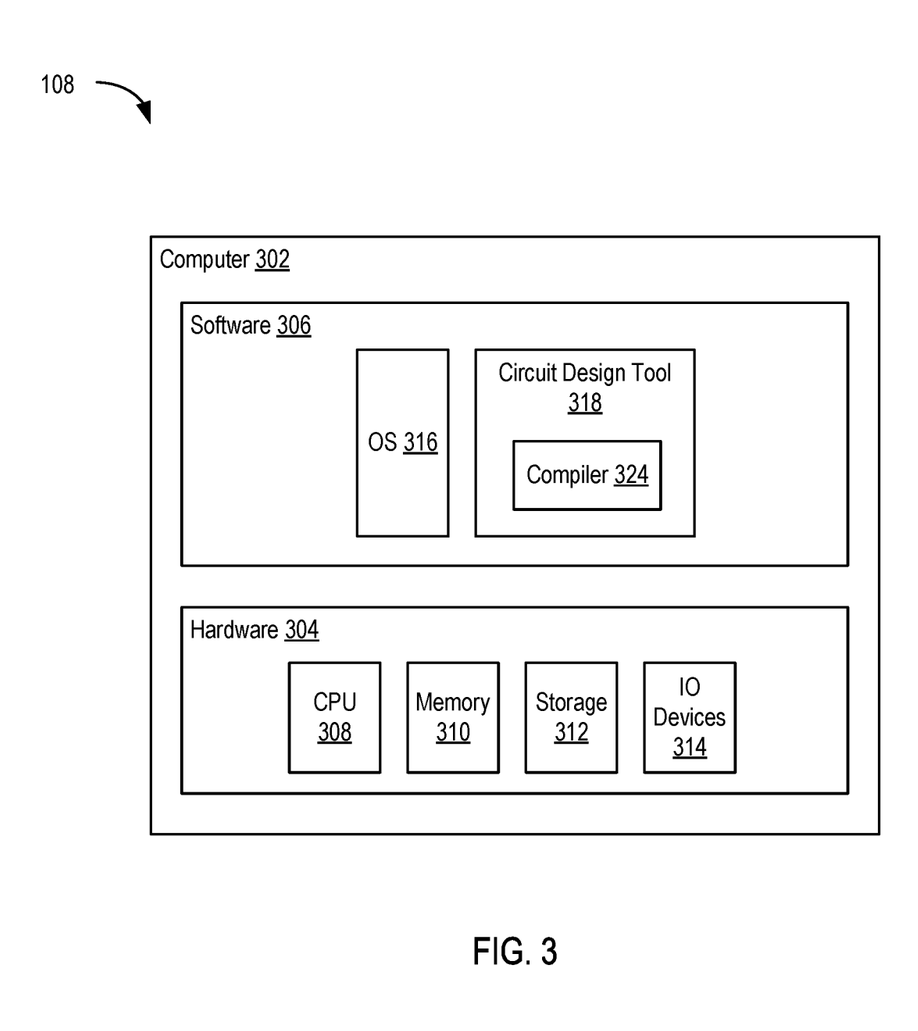
FIG. 3 is a block diagram depicting design tools according to an example.

FIG. 3 is a block diagram depicting the design tools 108 according to an example. The design tools 108 include a computer 302 having a hardware platform 304 and a software platform 306. The hardware platform 304 includes a CPU 308, a memory 310, storage devices 312, and input/output (IO) devices 314. The CPU 308 can be any type of microprocessor. The memory 310 can include, for example, one or more RAM modules, such as DDR DRAM. The storage devices 312 includes local storage devices (e.g., one or more hard disks, flash memory modules, solid state disks, and optical disks) and/or a storage interface that enables the computer 302 to communicate with one or more network data storage systems. The IO devices 314 enable communication to and from the computer 302. The software platform 306 includes an OS 316 and a circuit design tool 318. The OS 316 can be any commodity operating system known in the art, such as such as Linux®, Microsoft Windows®, Mac OS®, or the like. The circuit design tool 318 is configured to generate circuit designs that can be used to program programmable ICs. The hardware accelerator design tool 320 is configured to generate kernel designs for acceleration circuits. In particular, the circuit design tool 318 includes a compiler 324. A user interacts with the circuit design tool 318 to generate user design(s) for the acceleration circuit 130. The compiler 324 generates application circuit image(s).

Figure 4:
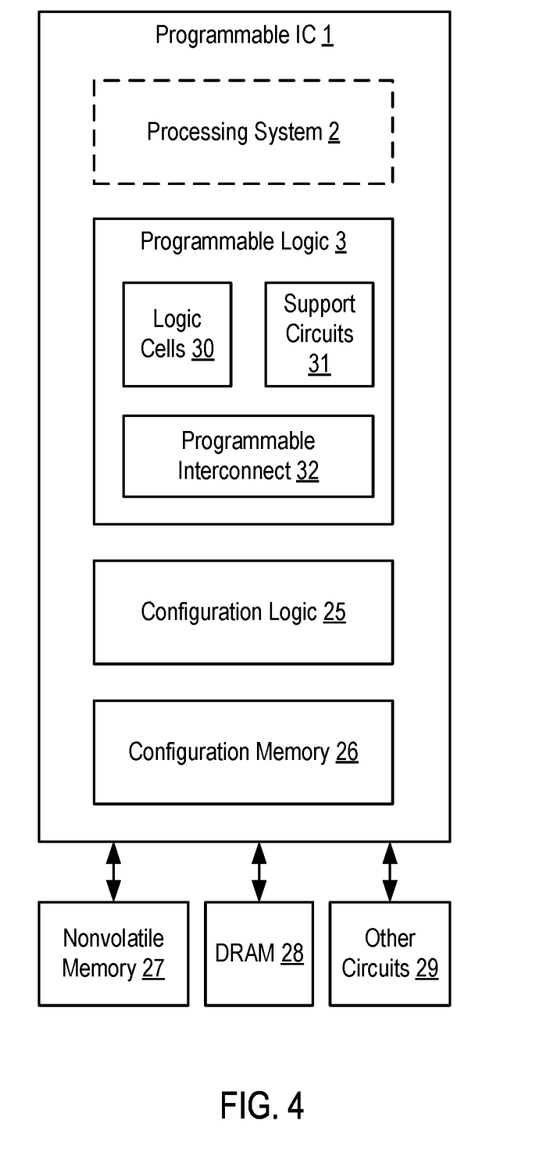
FIG. 4 is a block diagram depicting a programmable IC according to an example.
Figure 5:
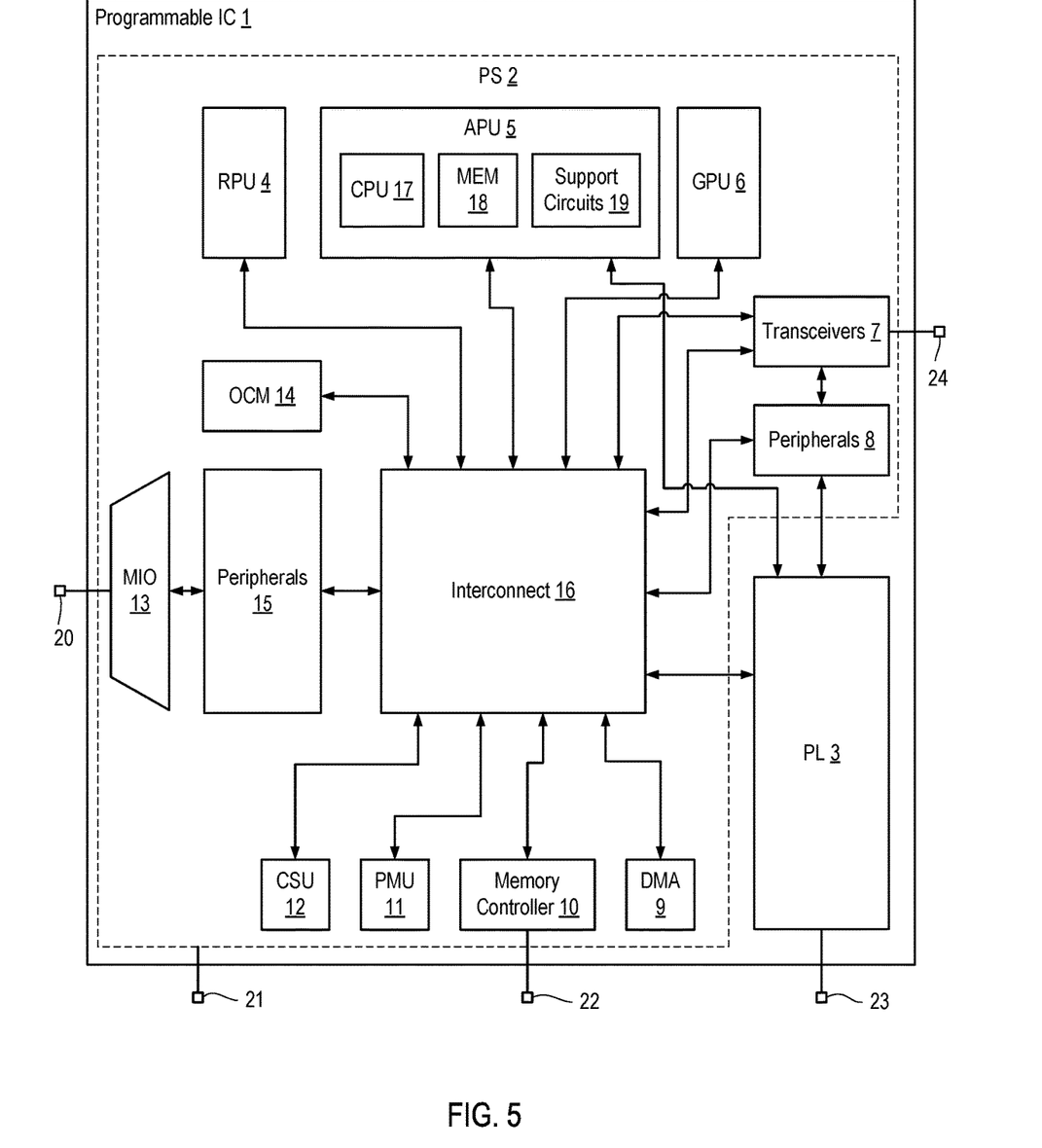
FIG. 5 is a block diagram depicting a System-on-Chip (SoC) implementation of the programmable IC according to an example.

FIG. 4 is a block diagram depicting a programmable IC 1 according to an example. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like. It should be understood that the techniques described herein can be implemented using a single IC (e.g., a programmable IC), an SoC (e.g., as shown in FIG. 5 and described below), or in a multi-chip system, where processors, memories, and programmable ICs are separate devices. In all cases, communication among the hardware components into the programmable IC (or programmable logic of an SoC) connect into the shell circuit, as described above.

FIG. 5 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 5, the programmable IC 1 can be used in the hardware accelerator 122 and can function as described above. The accelerator circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 6:
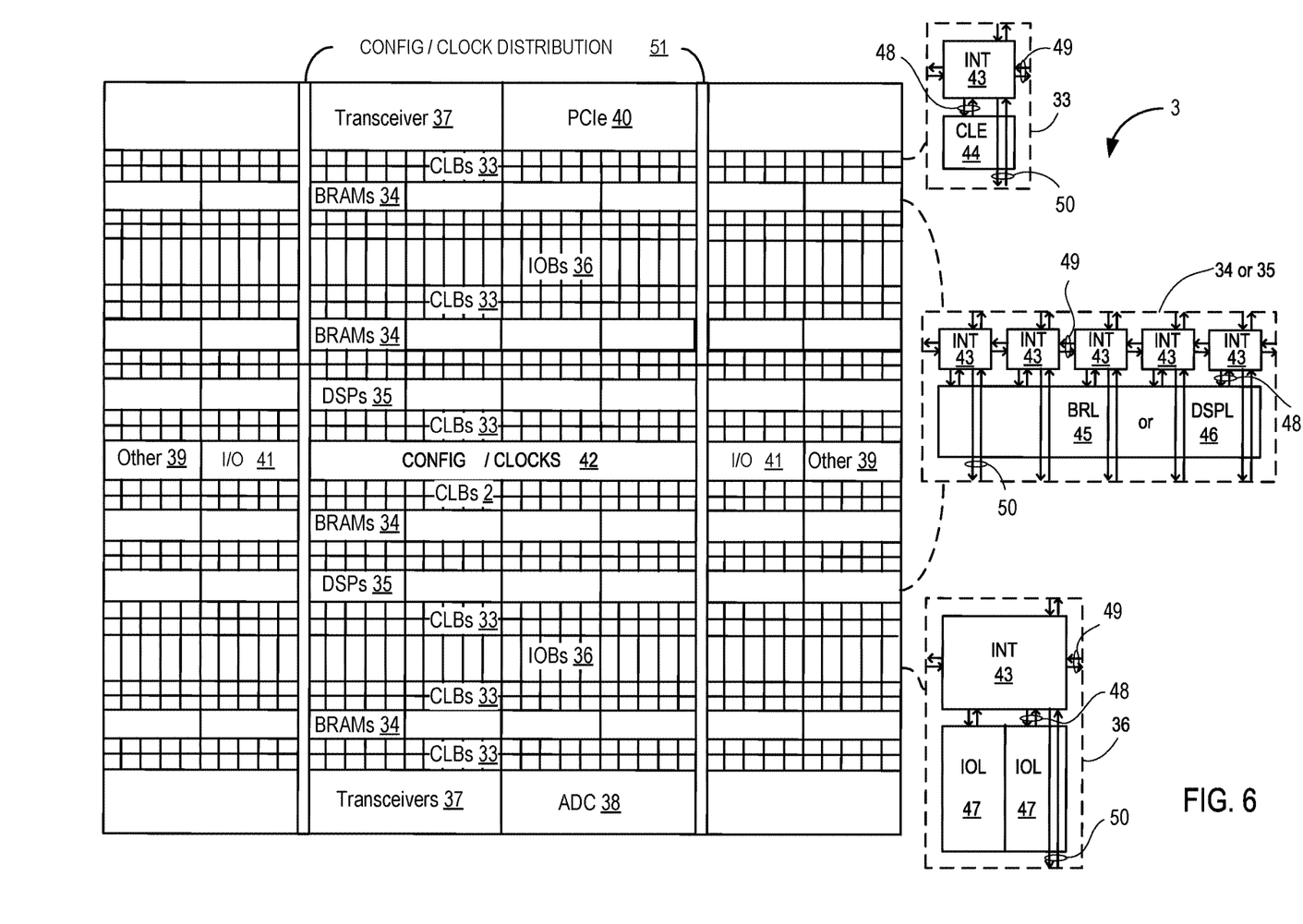
FIG. 6 illustrates a field programmable gate array (FPGA) implementation of the programmable IC.

FIG. 6 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 6. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 6) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, the design tools 108 also provide physical isolation between the privileged shell circuit and the unprivileged application circuit. With physical isolation, wiring that is part of the shell circuit can extend into the user region. In such case, user logic can connect to such wiring. Since the interface circuits (e.g., PCIe circuits) are at known locations, the user logic may obtain unauthorized access to the shell circuit at the physical level. Further, a single-event upset error can occur, causing changes in FPGA configuration that results in physical connection between the application circuit and the shell circuit.

In an example, the design tools 108 implement an isolation design flow. The isolation design flow is a mechanism to ensure isolation between regions on the device while permitting communication among those regions. The isolation design flow extends the partial reconfiguration flow with additional guarantees regarding physical isolation. The isolation design flow can ensure that even a single point failure does not unintentionally permit data to flow into an unauthorized region.

As noted above, the programmable fabric of a programmable IC, such as an FPGA, includes an array of tiles (e.g., FIG. 6). Although a routing wire may span several tiles (e.g., one, two, four, eight tiles horizontally or vertically), each routing wire has only one entry and one exit point. The FPGA configuration controls which signal is placed on which wire (if any) and whether or not the wire is used at its destination.

The isolation design flow enforces the concepts of regions and fences. A region, like a PR region, is a physical area of the FPGA. The area need not be rectangular. A region contains logically related logic and all the routing associated with the logic implemented therein. As with the logic, the routing for a region is constrained to remain physically inside a region.

A fence is a group of empty tiles (un-configured tiles) that serve to separate regions. Empty tiles in the fence may not put signals on routing wires or use signals on routing wires. The design tools 108 place a fence between regions that must be isolated from one another and restricts placement and routing of each bock into its region in a manner that follows the PR flow. All logic in a region is restricted to be placed within that region and signals connecting tiles inside a region may not enter the fence that surrounds the region. The fence provides a barrier for all signals between regions.

Signals are permitted to pass through fences via connections to allow regions to communicate with one another. These inter-region signals are identified in the design between adjacent regions. The inter-region signals are routed by the design tools 108 so that the inter-region signals do not contact any logic blocks inside the fence and also maintain isolation distance from other inter-region signals.

In an example, the design tools 108 chose one region for the privileged shell circuit and a separate region for the un-privileged application circuit. Signal isolation is provided by the placement and routing restrictions of the isolation design flow and are enforced by the design tools 108. The shell circuit is disposed in one or more isolation regions connected to the system signals on one side (e.g., PCIe signals) and the application circuit on the other side. The shell circuit includes all circuitry that connects to external signals, clocking logic, system monitor logic, and access to the internal configuration port. The shell circuit designer may include other resources as well. The shell circuit region need not be contiguous and may be disposed in one or more isolation regions.

The application circuit is disposed in one or more isolation regions separate from the shell circuit. The signals that the application circuit are permitted to use are connected to the shell circuit using the connections through the fence region.

Figure 7:
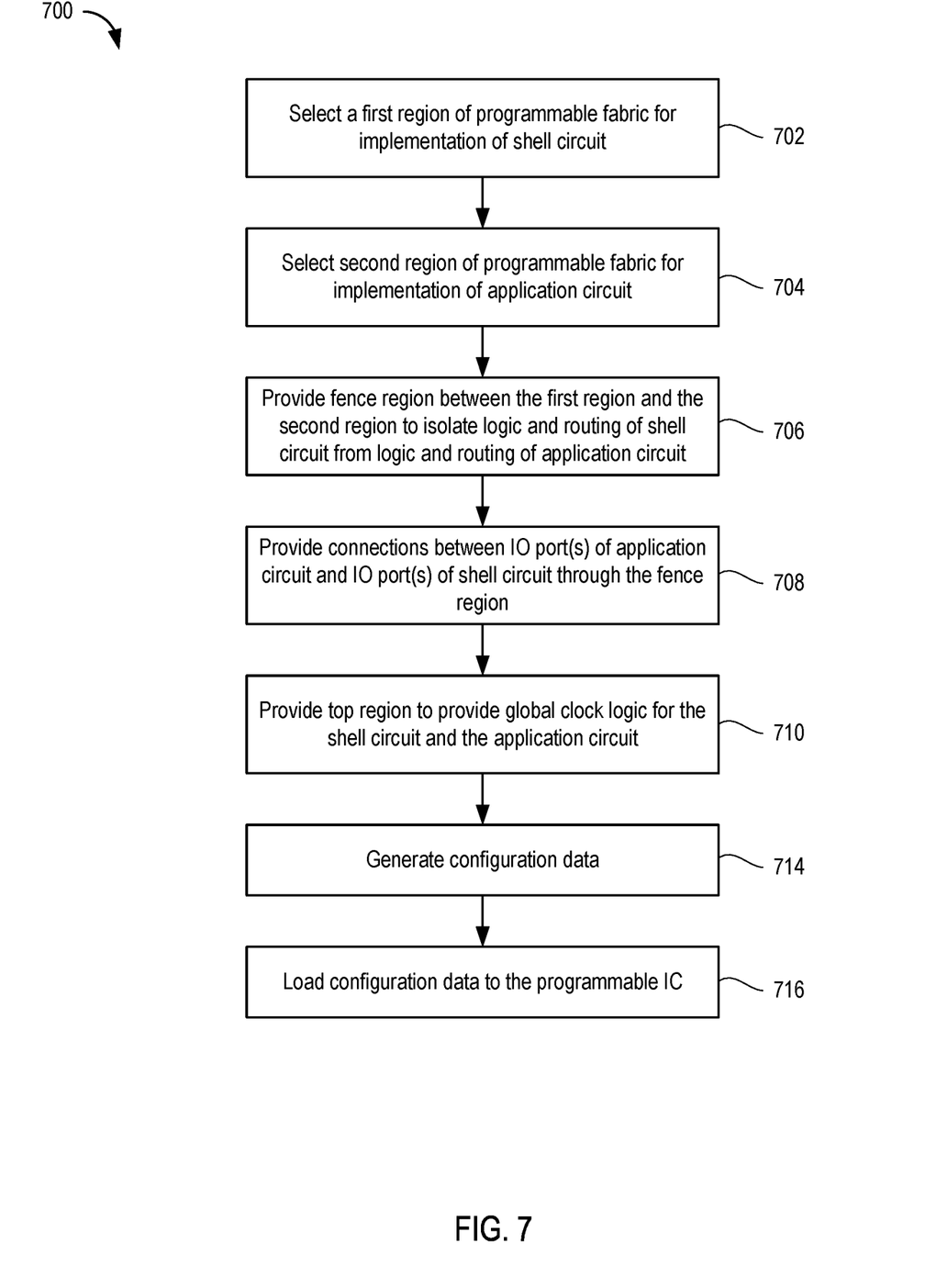
FIG. 7 is a flow diagram depicting a method of configuring a programmable IC in a computer system according to an example.
Figure 8:
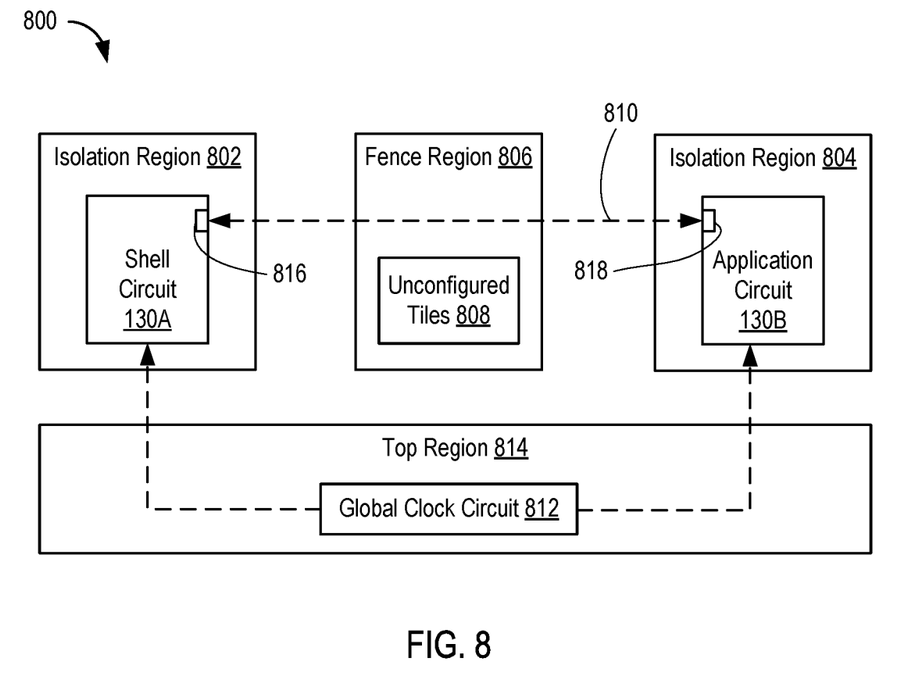
FIG. 8 is a block diagram depicting a circuit design according to an example.

FIG. 7 is a flow diagram depicting a method 700 of configuring a programmable IC in a computer system according to an example. FIG. 8 is a block diagram depicting a circuit design 800 according to an example. The method 700 begins at step 702, where the design tools 108 select a first region (isolation region 802) of the programmable fabric for implementation of the shell circuit 130A. At step 704, the design tools 108 select a second region (isolation region 804) of the programmable fabric for implementation of the application circuit 1306. At step 706, the design tools 108 provide a fence region 806 between the first region 802 and the second region 804 to isolate logic and routing of the shell circuit 130A from logic and routing of the application circuit 130B. At step 708, the design tools 108 provide connections 810 between IO port(s) 818 of the application circuit 1306 and IO port(s) 816 of the shell circuit 130A through the fence region 806. At optional step 710, the design tools 108 can provide a top region 814 to provide global clock logic 812 for the shell circuit 130A and the application circuit 130B. Alternatively, the global clock logic 812 can be provided in the shell circuit 130A. At step 714, the design tools 108 generate configuration data for a circuit design having the first region 802, the second region 804, and the fence region 806 (and optionally top region 814). At step 716, the design tools 108 load the configuration data to the programmable IC to implement the acceleration circuit 130.

In an example, the isolation design flow permits inclusion of runtime health checks. Referring to FIG. 2, these checks can be performed by a system monitor 250 disposed in the shell circuit. The system monitor 250 can identify potentially dangerous situations, including voltage and temperature out of range. A malicious or erroneous user application may create current spikes causing local voltage drops on the chip. This may cause the FPGA to reset. In extreme cases, the FPGA may give incorrect results. Another situation of concern is that the user application may consume too much power, exceeding the limits set by the cloud operator or creating an over-temperature situation. The system monitor 250 sets trigger points on the voltage and temperature and can signal an error condition to the computing system, which allows the shell circuit or the computing system to shut down the operation of the application circuit or the entire programmable IC. The shell circuit 130A can also include run-time checking logic 252 for checking the integrity of the isolation regions and fences during runtime. The run-time checking logic 252 uses an internal configuration access port 254 of the programmable IC to continually readback the configuration data of the device and uses checksum to verify the integrity of the fences and isolation regions. Any modification of the floorplan can be caught at run time.

While the foregoing is directed to specific examples, other and further examples may be devised without departing from the basic scope thereof, and the scope thereof is determined by the claims that follow.

What is claimed is:

1. A method of configuring a programmable integrated circuit (IC) in a computer system, comprising:
    selecting a first region of a programmable fabric of the programmable IC for implementation of a shell circuit, the shell circuit configured to interface with a bus of the computer system;
    selecting a second region of the programmable fabric for implementation of an application circuit, the application circuit configured to interface with the shell circuit;
    providing a fence region disposed between the first region and the second region, the fence region including a set of un-configured tiles of the programmable fabric;
    generating configuration data for a circuit design having the first region, the second region, and the fence region; and
    loading the configuration data to the programmable IC.

2. The method of claim 1, wherein the application circuit is coupled to the shell circuit using connections through the fence region.

3. The method of claim 2, wherein logic and routing of the application circuit is contained within the second region, wherein logic and routing of the shell circuit is contained in the first region, and wherein input/output (10) ports of the application circuit are coupled to 10 ports of the shell circuit by the connections.

4. The method of claim 1, further comprising:
    selecting a third region of the programmable fabric for implementation of global clock logic configured to provide clock signals to the shell circuit and the application circuit.

5. The method of claim 1, wherein the shell circuit includes a system monitor configured monitor the programmable IC and to signal the computer system in response to detecting an error condition.

6. The method of claim 1, wherein the shell circuit includes a run-time checking circuit configured to readback configuration data of the programmable IC and verify integrity of the first region, the second region, and the fence region.

7. The method of claim 6, wherein the run-time checking circuit is coupled to an internal configuration access port of the programmable IC.

8. A non-transitory computer readable medium having stored thereon instructions that when executed by a processor cause the processor to perform a method of configuring a programmable integrated circuit (IC) in a computer system, comprising:
    selecting a first region of a programmable fabric of the programmable IC for implementation of a shell circuit, the shell circuit configured to interface with a bus of the computer system;
    selecting a second region of the programmable fabric for implementation of an application circuit, the application circuit configured to interface with the shell circuit;
    providing a fence region disposed between the first region and the second region, the fence region including a set of un-configured tiles of the programmable fabric;
    generating configuration data for a circuit design having the first region, the second region, and the fence region; and
    loading the configuration data to the programmable IC.

9. The non-transitory computer readable medium of claim 8, wherein the application circuit is coupled to the shell circuit using connections through the fence region.

10. The non-transitory computer readable medium of claim 9, wherein logic and routing of the application circuit is contained within the second region, wherein logic and routing of the shell circuit is contained in the first region, and wherein input/output (10) ports of the application circuit are coupled to 10 ports of the shell circuit by the connections.

11. The non-transitory computer readable medium of claim 8, further comprising:
    selecting a third region of the programmable fabric for implementation of global clock logic configured to provide clock signals to the shell circuit and the application circuit.

12. The non-transitory computer readable medium of claim 8, wherein the shell circuit includes a system monitor configured monitor the programmable IC and to signal the computer system in response to detecting an error condition.

13. The non-transitory computer readable medium of claim 8, wherein the shell circuit includes a run-time checking circuit configured to readback configuration data of the programmable IC and verify integrity of the first region, the second region, and the fence region.

14. The non-transitory computer readable medium of claim 13, wherein the run-time checking circuit is coupled to an internal configuration access port of the programmable IC.

15. A computing system, comprising:
   a processing system;
   a hardware accelerator coupled to the processing system, the hardware accelerator including:
      a programmable integrated circuit (IC) configured with an acceleration circuit having a first region of a programmable fabric for implementation of a shell circuit, the shell circuit configured to interface with a bus of the processing system, a second region for implementation of an application circuit, the application circuit configured to interface with the shell circuit, and a fence region disposed between the first region and the second region, the fence region including a set of un-configured tiles of the programmable fabric;
   a software platform executing on the processing system, the software platform including program code executable by the processing system to interface with the hardware accelerator.

16. The computing system of claim 15, wherein the application circuit is coupled to the shell circuit using connections through the fence region.

17. The computing system of claim 16, wherein logic and routing of the application circuit is contained within the second region, wherein logic and routing of the shell circuit is contained in the first region, and wherein input/output (10) ports of the application circuit are coupled to 10 ports of the shell circuit by the connections.

18. The computing system of claim 15, wherein the shell circuit includes a system monitor configured monitor the programmable IC and to signal the computer system in response to detecting an error condition.

19. The computing system of claim 15, wherein the shell circuit includes a run-time checking circuit configured to readback configuration data of the programmable IC and verify integrity of the first region, the second region, and the fence region.

20. The computing system of claim 19, wherein the run-time checking circuit is coupled to an internal configuration access port of the programmable IC.

* * * * *

UNITED STATES PATENT AND TRADEMARK OFFICE
CERTIFICATE OF CORRECTION

PATENT NO.           : 10,657,292 B2                                   Page 1 of 1
APPLICATION NO.      : 15/845958
DATED                : May 19, 2020
INVENTOR(S)          : Stephen M. Trimberger It is certified that error appears in the above-identified patent and that said Letters Patent is hereby corrected as shown below:

In the Claims

Column 12, Line 14, Claim 3, delete "(10)" and insert -- (IO) --, therefor.

Column 12, Line 15, Claim 3, delete "(10)" and insert -- (IO) --, therefor.

Column 12, Line 60, Claim 10, delete "(10)" and insert -- (IO) --, therefor.

Column 12, Line 61, Claim 10, delete "(10)" and insert -- (IO) --, therefor.

Column 14, Line 11, Claim 17, delete "(10)" and insert -- (IO) --, therefor.

Column 14, Line 12, Claim 17, delete "(10)" and insert -- (IO) --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*